Sept. 14, 1965          J. BRIDGE          3,206,053

EQUIPMENT FOR HANDLING FREIGHT CONTAINERS

Filed April 15, 1964          7 Sheets-Sheet 1

INVENTOR.
John Bridge
BY
Attorney

Sept. 14, 1965  J. BRIDGE  3,206,053
EQUIPMENT FOR HANDLING FREIGHT CONTAINERS
Filed April 15, 1964  7 Sheets-Sheet 2

INVENTOR.
John Bridge
BY
Attorney

Sept. 14, 1965    J. BRIDGE    3,206,053
EQUIPMENT FOR HANDLING FREIGHT CONTAINERS
Filed April 15, 1964    7 Sheets-Sheet 3

INVENTOR.
John Bridge
BY
Attorney

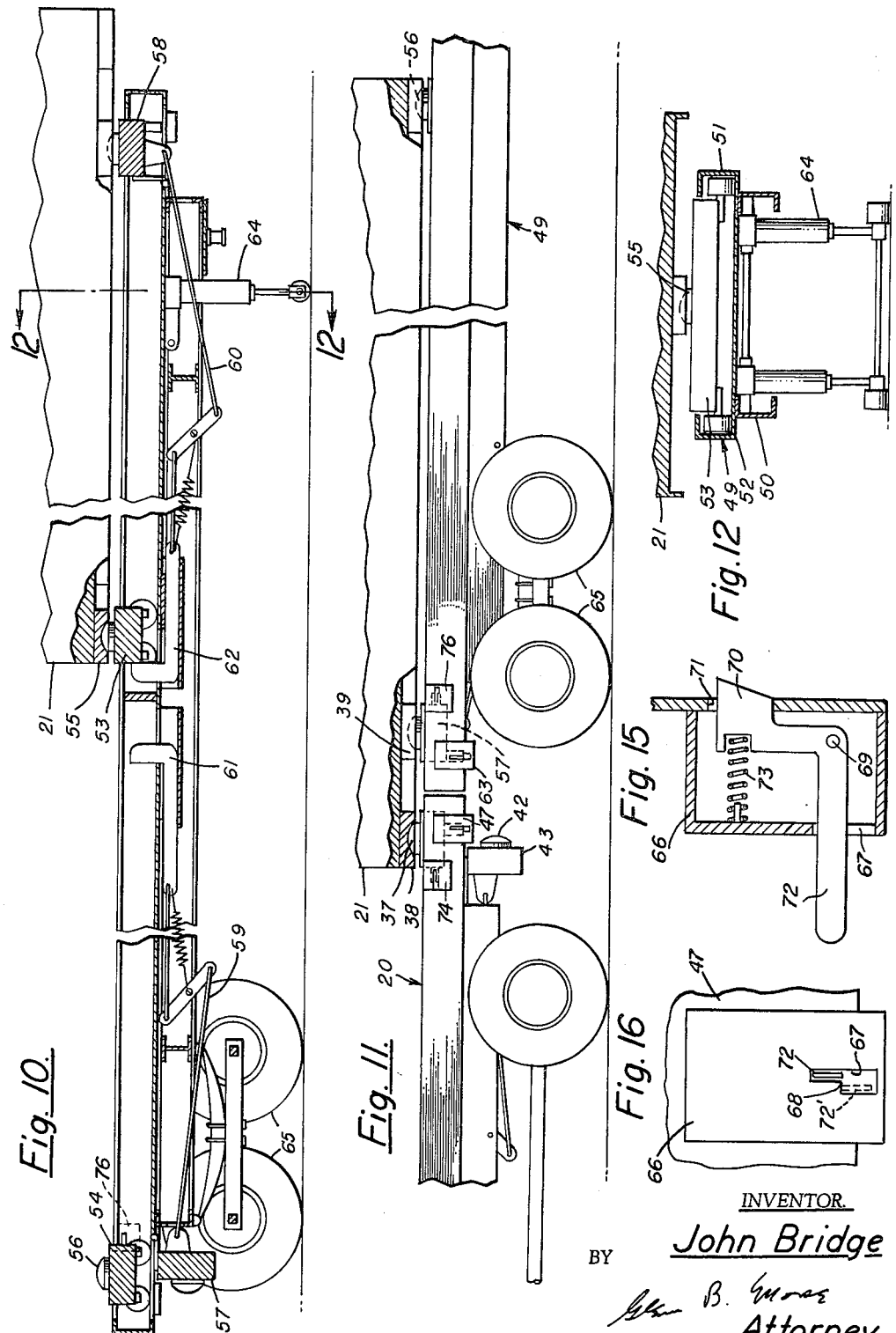

Sept. 14, 1965   J. BRIDGE   3,206,053
EQUIPMENT FOR HANDLING FREIGHT CONTAINERS
Filed April 15, 1964   7 Sheets-Sheet 6

INVENTOR.
BY   John Bridge
Attorney

United States Patent Office 3,206,053
Patented Sept. 14, 1965

3,206,053
EQUIPMENT FOR HANDLING FREIGHT
CONTAINERS
John Bridge, % Motor Carrier Labor Advisory Council,
343 S. Dearborn St., Chicago, Ill.
Filed Apr. 15, 1964, Ser. No. 362,551
5 Claims. (Cl. 214—516)

This invention relates to the handling of containerized freight and is a continuation-in-part of my application, now abandoned, Serial No. 232,790, filed October 24, 1962. It is generally recognized that large savings in the transportation and handling of freight can be realized by working with a loaded container as a unit, rather than loading, unloading, and reloading a large quantity of assorted items at each transfer point. Experience has established a considerable number of advantages to this general system, such as the following:

(1) A container representing a fractional truckload can be loaded at a point of origin without committing a hauling vehicle during the loading period.

(2) Breaking a shipment at a transfer point (so that portions go to separate destinations) becomes a simple matter when a container is originally loaded entirely for one ultimate destination, and can be transferred bodily from one vehicle to another at the transfer point.

(3) On arrival at the ultimate destination, the loaded container may remain on the premises to function as a warehouse.

(4) The individual container may be used with a suitable truck chassis to function as a local delivery unit within the destination area.

(5) Appropriate vehicles for hauling the container may be selected and used according to the best efficiency for the distance involved.

(6) The saving of time at the transfer points, and the reduction of congestion in these areas reduces not only the cost, but also the intransit time required to move a shipment from point of origin to its ultimate destination.

The principal limitation on the use of the containerized freight system has been the difficulty in transferring the loaded container from one supporting structure or means to a second supporting structure or means, such as, from vehicle to vehicle, or between the vehicle and a loading dock. This problem will be appreciated when one realizes that it is not at all uncommon for a container to be loaded so that it represents ten thousand to twenty thousand pounds. Elaborate auxiliary equipment has been developed for handling the loaded containers, and these include gantry cranes, so-called "straddle lifters," special heavy-duty lift trucks, and specialized side-loading carriers having equipment for moving a container laterally with respect to the direction of movement of the carrier. These devices have all been used extensively, and perform their functions fairly adequately in the hands of highly skilled operators. The difficulty in the use of them results from the cost of the transfer equipment itself. Anywhere from twenty thousand dollars to one hundred thousand dollars is not at all uncommon, and it is obvious that this cost factor will serve as a limitation upon the use of the entire containerized freight system. The containers cannot be moved to or from any locality which does not have the necessary equipment or installation to accommodate the transfer of the containers to and from the hauling vehicles.

The present invention provides for the transfer of the loaded containers without involving any equipment other than that associated directly with the carrying vehicle. The degree of specialization of the vehicle is so small that the cost of converting a standard chassis to utilize the system is relatively insignificant.

The general principle of the system is an arrangement for providing for relative movement between the container and the vehicle so that the power of the vehicle itself, as delivered to its supporting wheels, can be applied to moving the container to and from the carrying position on the vehicle. Stated thus broadly, this principle is not new. Examples of its application are to be found in U.S. Patents Nos. 1,915,883 and 2,543,295. The preferred form of the invention includes three general features: (a) a movable carriage on the vehicle chassis for pivotally supporting one end of the container, the carriage being movable in front-to-rear and rear-to-front directions with respect to the vehicle, (b) a vertically engageable locking arrangement for horizontally securing the position of the container with respect to the ground during the shifting of the container on the vehicle, and (c) an arrangement for vertically positioning the container with respect to the ground. In some instances, the movable carrier can be eliminated by dragging the container across the platform on the vehicle along a guided path of a pivot axis, if the locking action is secure enough to resist the friction forces. With a freely moving carrier, friction alone can sometimes be used as a sufficient locking to generate the necessary reaction forces as the vehicle shifts its position with respect to the container during the transfer operation. The function of the locking is to provide these reaction forces, and the nature of the locking end of the support of the container on the vehicle are mutually interrelated variables such that a reduction in the friction of the shifting movement will correspondingly reduce the magnitude of the locking forces. The locking system is preferably also used to secure the container to the vehicle for travel, but that is another matter in addition to the shifting operation.

The several features of the invention will be analyzed in further detail through a discussion of the particular embodiments illustrated in the accompanying drawings. In the drawings:

FIGURE 1 presents a perspective view of a loaded container in an intermediate position in the shifting of the container to or from the transfer vehicle.

FIGURE 2 presents a fragmentary sectional elevation showing the structure of the vehicle and the container shown in FIGURE 1, but in a position closely approaching the final carrying position of the container on the vehicle. FIGURE 2 is a section on the plane 2—2 of FIGURE 4.

FIGURE 3 illustrates the same mechanism shown in FIGURE 2, but in position to complete the transfer of the loaded container from the freight dock.

FIGURE 4 presents a rear view of the container in position on the vehicle, in the normal carrying position.

FIGURE 5 is a section on the plane 5—5 of FIGURE 2.

FIGURE 8a to 8k present a series of related schematic views showing the preferred sequence of operations in transferring the container from a vehicle to a freight dock or other receiving station, and return.

Figure 9:
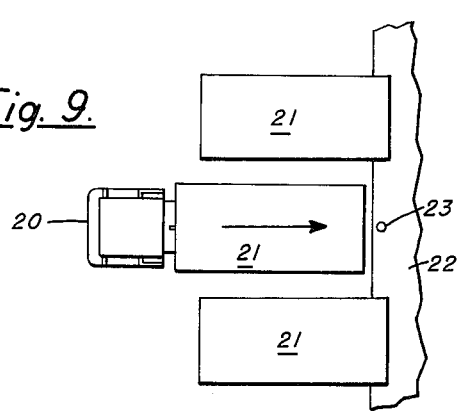
Figure 8K:
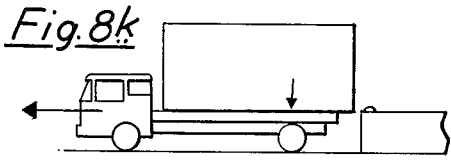
Figure 13A:
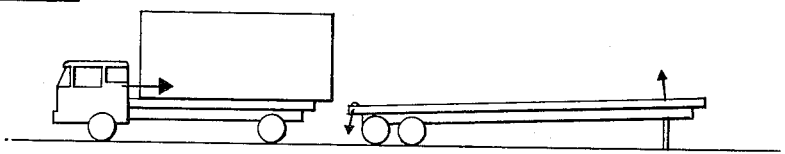
Figure 13B:
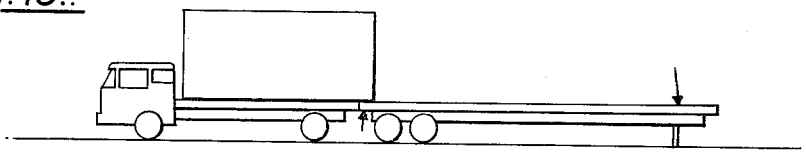
Figure 13C:
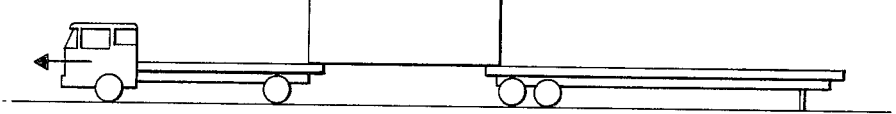
Figure 13D:
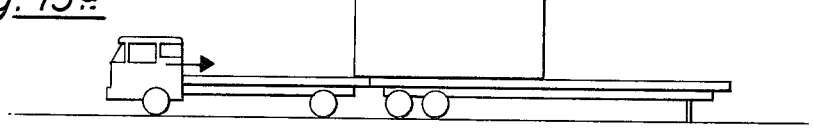
Figure 13E:
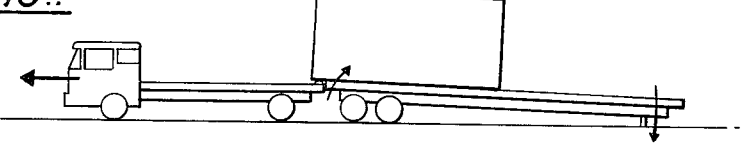
Figure 13F:
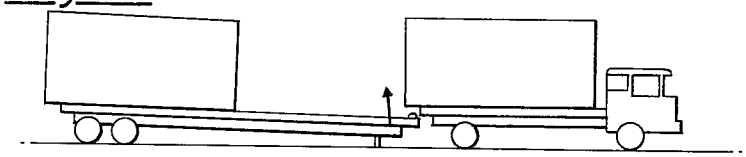
Figure 13G:
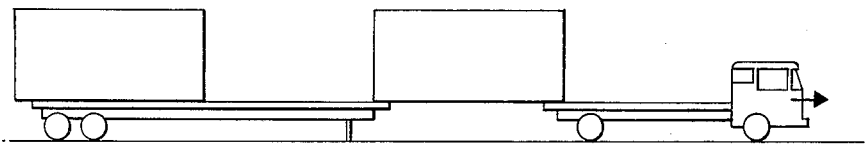
Figure 13H:
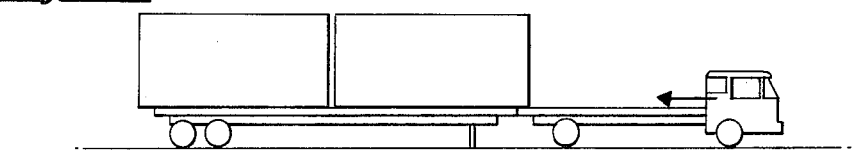
Figure 13I:
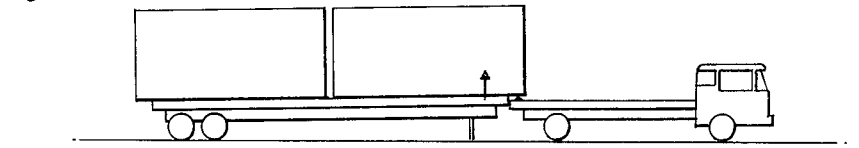

FIGURE 9 is a plan view showing the position of the containers in conjunction with the freight dock.

FIGURE 10 presents a sectional elevation of a trailer vehicle adapted to accommodate two loaded freight containers.

Figure 1:
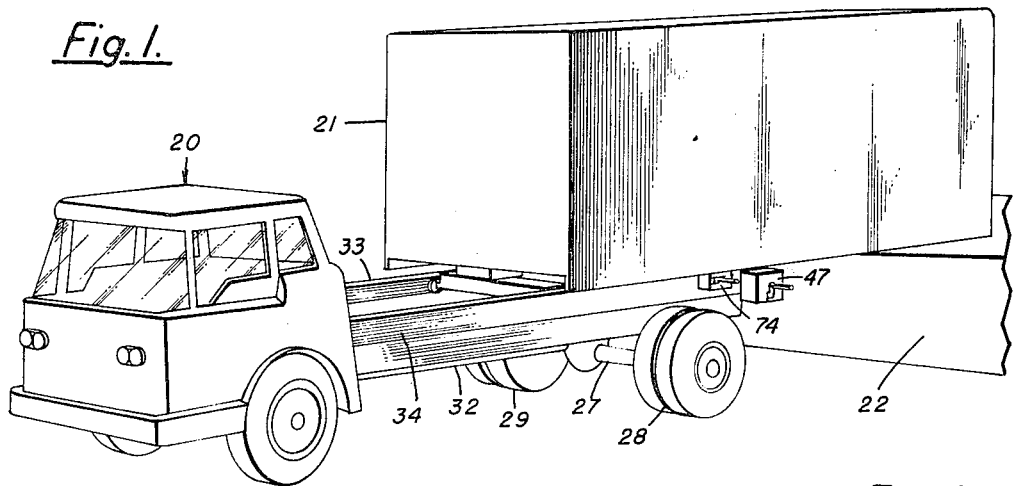

FIGURE 11 illustrates the method of transferring a container to and from the dual trailer shown in FIGURE 10, with a vehicle of the type shown in FIGURE 1.

FIGURE 12 is a section on the plane 12—12 of FIGURE 10.

FIGURES 13a to 13i present a series of related views illustrating the sequence of operations in transferring a container from the FIGURE 1 vehicle to and from the FIGURE 10 dual trailer.

Figure 14:
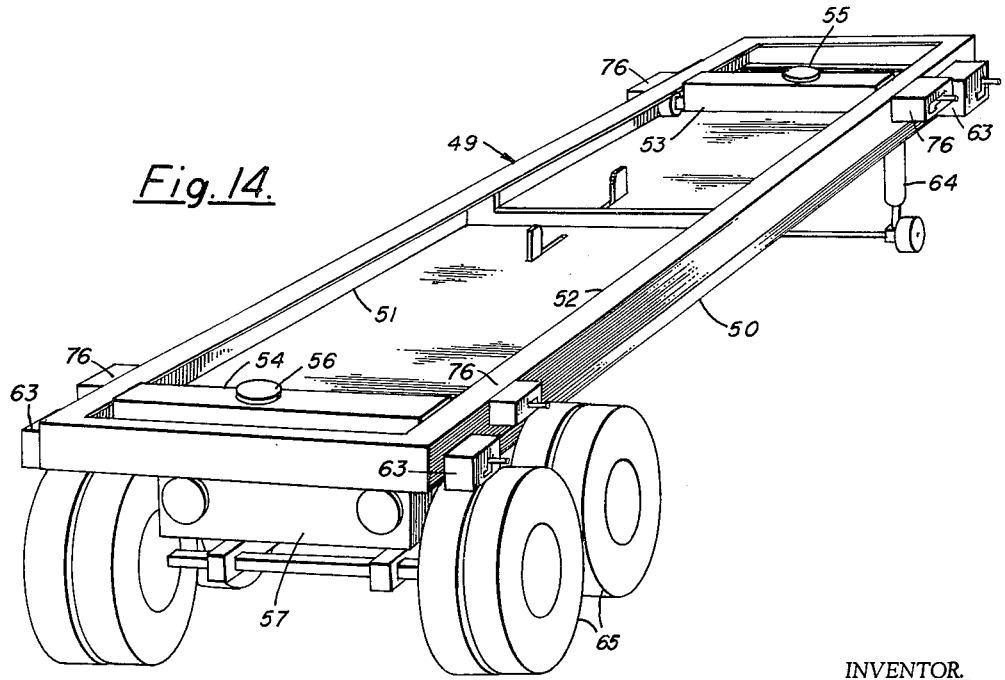

FIGURE 14 is a perspective view of the trailer shown in FIGURE 10.

Figure 2:
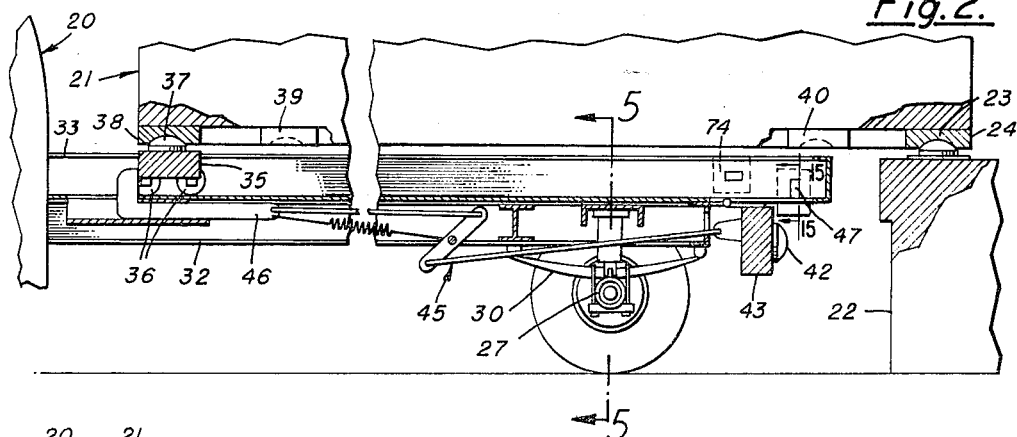

FIGURE 15 is a section on the plane 15—15 of FIGURE 2 showing to advantage one of the latch mechanisms.

FIGURE 16 is an enlarged view of one of the latch mechanisms.

FIGURES 17a to 17f present a sequence of operations in transferring a container from the FIGURE 1 vehicle to the FIGURE 10 dual trailer.

Figure 3:
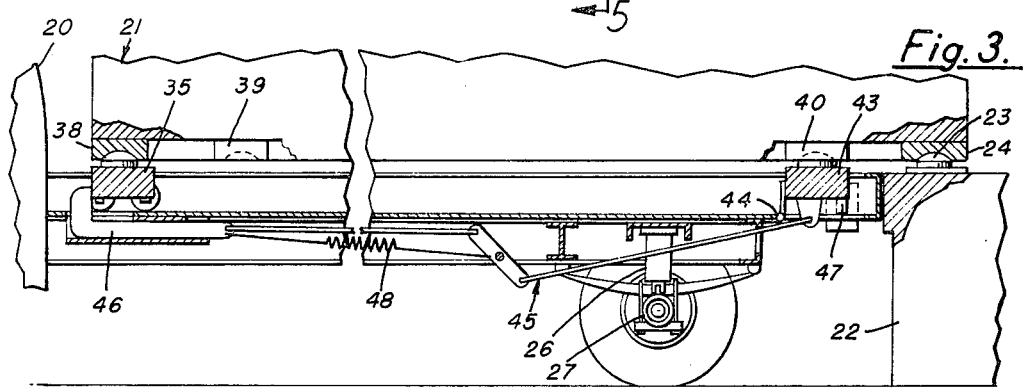
Figure 4:
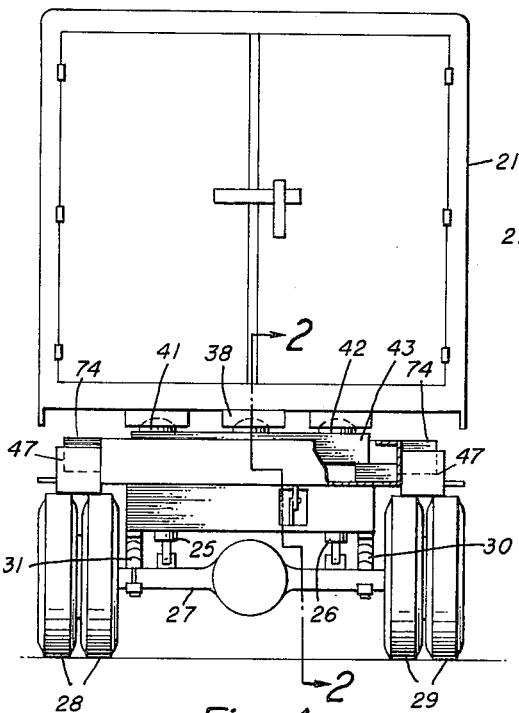
Figure 5:
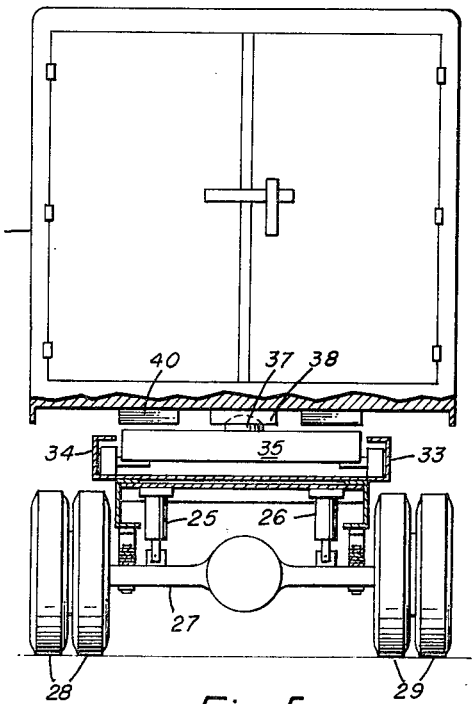
FIGURE 5 illustrates the elevated position of the container with respect to the ground utilized to engage and disengage the container from the locking devices.
Figure 6:
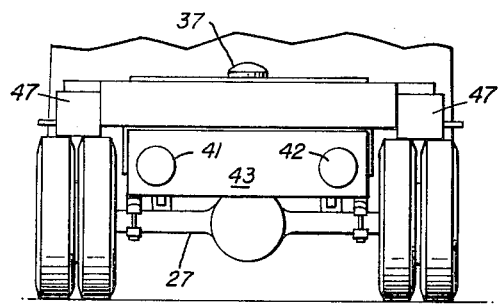
FIGURE 6 is a rear view of the vehicle with the container fully removed.
Figure 7:
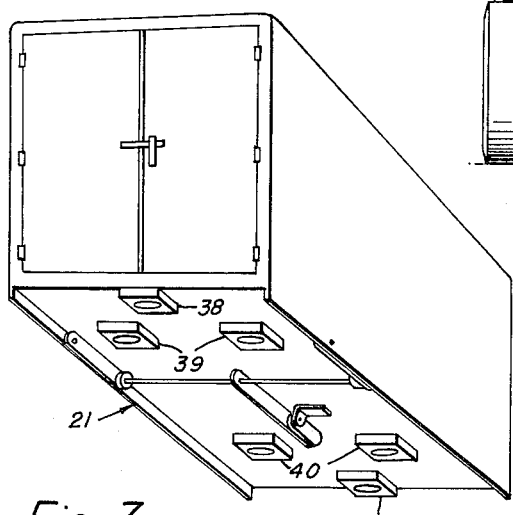
FIGURE 7 is a perspective view showing the understructure of the container shown in FIGURES 2 and 3.
Figure 8A:
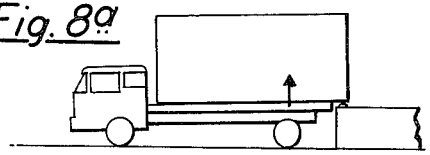
Figure 8B:
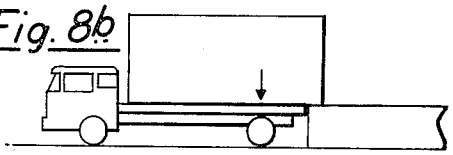
Figure 8C:
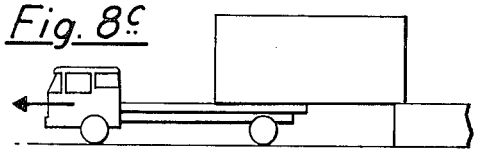
Figure 8D:
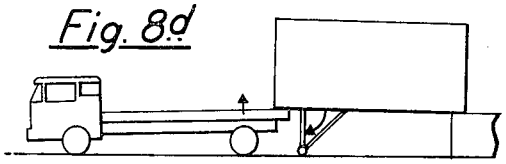
Figure 8E:
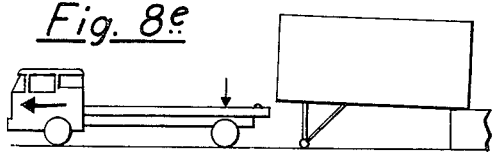
Figure 8F:
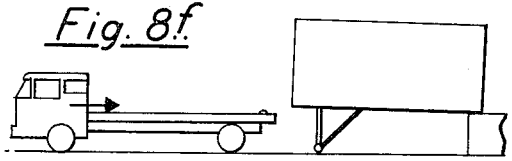
Figure 8G:
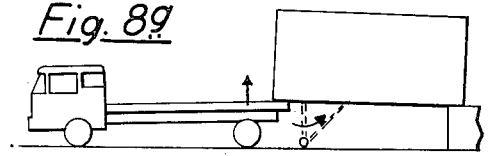
Figure 8H:
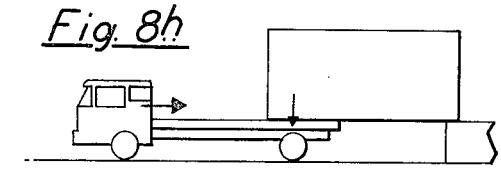
Figure 8I:
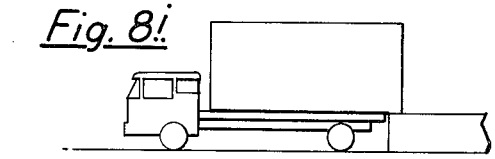
Figure 8J:
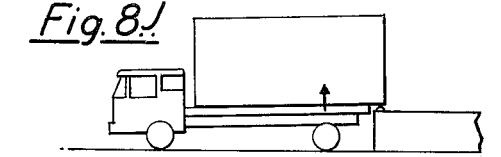

Referring particularly to FIGURES 1, 2, and 3, a first container supporting structure or means in the form of the vehicle generally indicated at 20 is shown in the process of engaging the container 21. A second container structure or means including a freight dock 22 supports the rear end of the container 21, with the forward end being supported by auxiliary ground engaging means when disengaged from the vehicle 20. A dome-shaped locking device or dome means 23 is mounted on the freight dock 22, and engages a mating recess on the socket member 24 mounted at the rear underside of the container 10 to fix the lateral position of the container 21 with respect to the ground so that the vehicle 20 may move to or from a position underneath the container during the transfer procedure. The socket member 24 is initially placed in engagement with the dome 23 by elevating the container 21 with respect to ground level through the action of the hydraulic jacks 25 and 26 (refer to FIGURE 5), which have the effect of raising the chassis of the vehicle 20 with respect to the axis of the wheels. When the jacks 25 and 26 have raised the container enough so that the socket member 24 can pass over the dome 23, the jacks 25 and 26 can be lowered into the normal running position shown in FIGURE 4, so that the end of the container is supported on the dome 23. During this raising and lowering, the axle assembly 27 and the wheel groups 28 and 29 remain fixed with respect to ground level, with the springs 30 and 31 flexing appropriately to accommodate this movement.

The conventional vehicle chassis is indicated at 32, and a pair of opposite rails 33–34 are mounted on the chassis 32 by any convenient method such as bolts or welding. These rails form a guideway providing a freedom of front-to-rear and rear-to-front movement for the carrier 35 supporting the forward end of the container 10. Preferably, a pair of rollers 36 is mounted at the opposite ends of the carrier 35 for reducing the friction of this movement. The carrier 35 is equipped with a central dome means 37 which is disposed to engage a similarly-formed recess in the forward socket member 38 mounted on the container 21. When a single supporting and locating dome is used in central position, as shown in these drawings, the interengagement of the dome 37 and the socket member 38 provides a swivel action on a vertical axis, and also a limited degree of articulation on horizontal axes, which considerably facilitates the handling and placement of the container 21 by the vehicle 20.

The container 21 is also provided with rearward socket means comprising pairs of laterally-spaced socket members 39 and 40 for alternatively receiving similarly spaced lock means having dome means as are indicated at 41 and 42. These are mounted on the shelf 43 of the lock means hinged at 44 to the chassis of the vehicle 20 so that it is capable of swinging between inoperative and operative positions shown in FIGURE 2 and FIGURE 3, respectively. When the weight of the rear of the container is supported by the dock 22 on the dome 23, the vehicle 20 may be backed from the FIGURE 2 to the FIGURE 3 position, which results in the actuation of the linkage 45 by the control member 46 as it is engaged by the carrier 35 on the approach of the container and the vehicle to the final carrying position. On reaching the FIGURE 3 position, the shelf 43 is engaged by the latch devices 47 located on each side of the vehicle, so that the weight of the container need not be carried by the linkage 45. Actuation of the jacks 25 and 26 will then transfer the weight of the rear portion of the container from the dock to the domes 41 and 42. Further elevation will raise the socket member 24 sufficiently for the container to clear the dome 23, and the vehicle may move off to its destination. On delivery of the container to the dock 22, substantially the reverse of this procedure is followed. The jack units 25 and 26 are elevated enough for the vehicle to place the socket member 24 over the dome 23, followed by a lowering of the jacks to place the weight of the rear portion of the container on the dock, thus removing the load from the retractable shelf 43. The latch devices 47 may then be disengaged, and the forward movement of the vehicle will result in relative displacement of the container with respect to the vehicle, accompanied by a downward swinging of the shelf 43 as the carrier 35 moves back, the linkage being retracted by the action of the spring 48 as the control member 46 follows the carrier 35 in its movement. On withdrawal of the vehicle to the extent of the movement of the carrier 35, the container and the vehicle assume the relative position shown in FIGURE 8d. Under these conditions, the jacks 25 and 26 may be elevated, and a conventional "landing gear" associated with trailers and other containers may be lowered into position, followed by lowering of the jacks 25 and 26 to transfer the load from the carrier 35 to the auxiliary landing gear. This sequence of operations is schematically illustrated in FIGURES 8a to 8k for both the initial placement of the container on the dock and the retrieving of it from the dock.

Referring to FIGURES 15 and 16, each latch device 47 includes a cover member 66 which has a slot 67 therein with a shoulder 68. Pivotally connected to cover member 66 by means of a shaft 69 is a dog member 70 which extends through an opening 71 in the vehicle frame and is adapted to engage shelf 43. Dog member 70 includes an integral handle portion 72 which extends outwardly through slot 67. A spring 73 is disposed between dog member 70 and cover member 66, as shown, to bias dog member 70 normally to the position shown in FIGURE 15. The latch device 47 may be maintained in an inoperative position by actuating handle 72 to the position 72' shown in FIGURE 16, whereby dog member 70 is retracted to a position where it cannot engage shelf 43.

Vehicle 20 also includes a pair of latch devices 74 which serve to lock carrier 35 in its rearmost position (FIGURE 11) under certain conditions of operation, as explained more fully hereinafter. Latch devices 74 are identical in construction to latch devices 47, and so reference is made to FIGURES 15 and 16 for the details of their construction. It will be noted, however, that latch devices 47 are rotated 90° in a clockwise direction, as viewed in FIGURE 2, relative to latch devices 47 since they serve to prevent horizontal movement of carrier 35.

Vehicle-to-vehicle transfers of containers may be accomplished very easily through the use of the vehicle shown in FIGURE 1 and a trailer vehicle of the type illustrated in FIGURE 14. This double trailer 49 includes a conventional chassis structure 50 on which guideways are mounted on the opposite sides as shown at 51 and 52. These are divided into front and rear portions, and each of these is equipped with a movable carrier, as shown at 53 and 54, respectively. The carrier 53 is provided with a central dome 55, and the carrier 54 has the central dome 56, with this assembly functioning almost identically to the assembly based upon the carrier 35 discussed in connection with FIGURES 2 and 3. Retractable lock means includes shelf structures 57 and 58 are mounted at opposite ends of the trailer 49, both of these functioning in the same manner as the shelf 43. Also, the latch devices 63 and 76 correspond to latch devices 47 and 74, respectively, and perform similar functions. The linkages 59 and 60 also correspond to the linkage 45, with the control members 61 and 62 corresponding to the control member 46. FIGURE 11 illustrates the last stage of the transfer of the container 21 from the vehicle 20, with the dual trailer 49 acting as a receiving station, and the final disengagement awaits the lowering of the jack devices 25 and 26 so that the dome 37 can be disengaged from the socket member 38. The vehicle 20 has moved the container 21 into the position shown in FIGURE 11, accompanied by the swing of the shelves 57 upwardly by the linkage 59 so that the domes carried by it could engage the socket members 39 on the container. Engagement of the latches 63 prepares the assembly for the lowering of the jacks 25 and 26 on the vehicle 20 so that the container is then fully supported by the trailer 49. This sequence of operations for loading a container on the trailer is shown in FIGURES 17a to 17f.

Figure 17A:
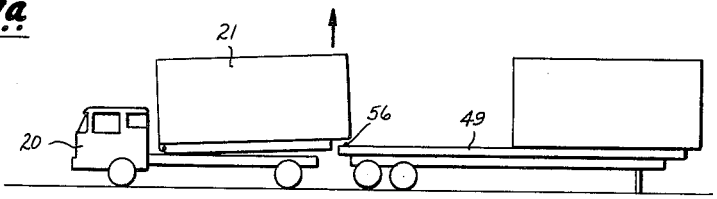
Figure 17B:
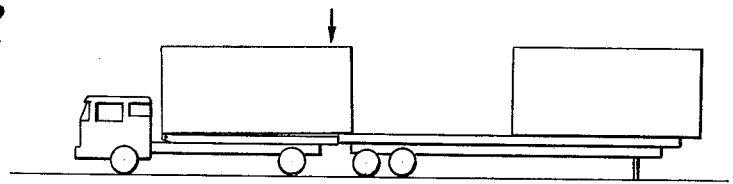
Figure 17C:
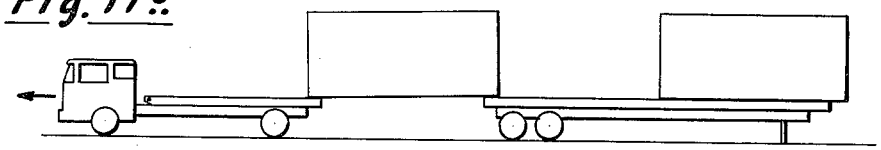
Figure 17D:
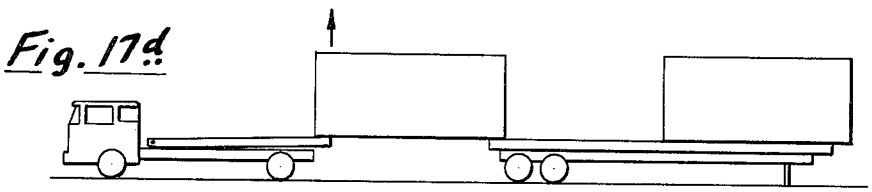
Figure 17E:
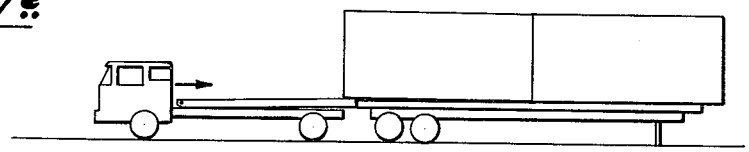
Figure 17F:
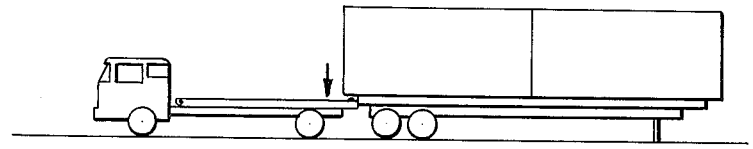

More specifically, vehicle 20 backs up to a double trailer 49 and at the same time actuators 26 are extended to elevate the rear end of container 21 to clear dome 56 (FIGURE 17a). Actuators 26 are then retracted so the container 21 is engaged by dome 56. Next, latch devices 47 are released and the vehicle is then driven forwardly until disposed as shown in FIGURE 17c. At this point carrier 35 is locked in its rearmost position by latch devices 74. Now, the operator releases latch devices 76 so that carrier 54 may move towards the center of trailer 49, the front end of trailer 26 is raised by extending actuators 26 and the vehicle 20 is again backed toward double trailer 49 until container 21 is disposed as shown in FIGURE 17e. Actuators 26 are then retracted until dome 37 is disengaged from container 21.

If desired, the action of the jacks 25 and 26 may be supplemented or replaced by a hydraulic landing gear device shown at 64. This unit retracts in a conventional fashion by swinging from a vertical to a horizontal position, and the actuation of this unit when swung to the vertical position will raise or lower that portion of the trailer 49 to produce a rocking motion about the wheel assembly 65 as a fulcrum. This rocking motion may be used to engage and disengage the domes at either end of the trailer 49. Normally, the adjustable landing gear 64 would be powered by hydraulic pressure supplied by conventional fittings associated with the vehicle 20. This sequence of operations for loading and unloading a container is shown in FIGURES 13a to 13i.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. An apparatus for use with a freight container having a bottom wall formed with first socket means at one end thereof and second socket means at the other end thereof comprising, a supporting structure for supporting said container with the said one and the said other ends of the latter overlying correspondingly longitudinally spaced apart first and second portions of said supporting structure, carrier means mounted on said supporting structure for longitudinal movement between said first and second portions of said supporting structure, said carrier means having first dome means for engaging said first socket means of said bottom wall of said container, lock means rotatably mounted at said second portion of said supporting structure to operative and inoperative positions, said lock means having second dome means engageable in the operative position thereof with said second socket means of said bottom wall of said container in the supported position of the latter on said supporting structure, said first and said second dome means in their engaged positions with said first and second socket means of said bottom wall of said container preventing fore and aft and transverse movements of said container relative to said supporting structure, and said carrier means and said container in the inoperative position of said lock means being movable longitudinally relative to said supporting structure.

2. A container transporting vehicle comprising elongated normally horizontally disposed container supporting means having a loading-unloading end, means connected to the said supporting means for elevating said end thereof above the horizontal, container engaging means connected to the said supporting means and movable between a first position adjacent the said end thereof and a second position longitudinally spaced away from the said end, means for locking the said engaging means at the said first position, and container securing means connected to the said end of the said supporting means and movable between operative and inoperative positions.

3. A container transporting vehicle comprising elongated normally horizontally disposed container supporting means having a loading-unloading end, means connected to the said supporting means for elevating said loading-unloading end of the said supporting means above the horizontal, first container engaging means connected to the said supporting means and movable between a first position adjacent the said loading-unloading end of the said supporting means and a second position adjacent the other end of the said supporting means, means for locking the said first engaging means in the said first position, and second container engaging means connected to the said supporting means adjacent the said loading-unloading end thereof and movable between an operative position and an inoperative position.

4. A container transporting vehicle comprising normally horizontally disposed elongated container supporting means having front and rear ends and an upper margin, means connected to the said supporting means for raising the said rear end thereof above the horizontal, a carrier connected to the said supporting means for partially supporting a container and including dome means for engaging the container, the said carrier being movable between a first position adjacent the said rear end and a second position adjacent the said front end, and dome means connected to the said supporting means for engaging the container and movable between a position extending above the said margin and a position below the said margin.

5. A vehicle as set forth in claim 4 and including means for locking the said carrier in the said first position.

References Cited by the Examiner

UNITED STATES PATENTS

| | | | |
|---|---|---|---|
| 1,358,512 | 11/20 | Bonner | 214—38.8 X |
| 2,151,640 | 3/39 | Menning | 214—38.44 X |
| 2,693,889 | 11/54 | Fellabaum | 214—38.22 |
| 2,786,590 | 3/57 | Edwards et al. | 214—38.10 X |
| 3,002,636 | 10/61 | Felburn | 214—38.10 |
| 3,077,278 | 2/63 | Alexander | 214—517 |

GERALD M. FORLENZA, *Primary Examiner.*

HUGO O. SCHULZ, *Examiner.*